(12) United States Patent
Potyrailo et al.

(10) Patent No.: US 6,460,417 B1
(45) Date of Patent: Oct. 8, 2002

(54) FORMABILITY TESTING OF SMALL-SIZE COATINGS AND MATERIALS

(75) Inventors: Radislav Alexandrovich Potyrailo, Niskayuna; Bret Ja Chisholm, Clifton Park; Daniel Robert Olson, Voorheesville, all of NY (US); James Norman Cawse; Michael Matthew Laurin, both of Pittsfield, MA (US); George Frederic Medford, Ballston Lake; Hariklia Dris Reitz, Clifton Park, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/682,355

(22) Filed: Aug. 24, 2001

(51) Int. Cl.[7] ................................................ G01B 11/16
(52) U.S. Cl. ............................................ 73/762; 73/800
(58) Field of Search ......................... 73/826, 827, 762, 73/800, 838, 835, 849, 812

(56) References Cited

U.S. PATENT DOCUMENTS

| | | | |
|---|---|---|---|
| 4,031,746 A | 6/1977 | Kuruta et al. | |
| 4,241,801 A | 12/1980 | Kushmuk | |
| 5,193,398 A | 3/1993 | Harder et al. | |
| 5,568,259 A | 10/1996 | Kamegawa | |
| 5,763,789 A | 6/1998 | Ettemeyer | |
| 6,050,138 A | * 4/2000 | Lynch et al. | 73/150 A |
| 6,151,123 A | 11/2000 | Nielsen | |
| 6,207,030 B1 | * 3/2001 | Zdunek et al. | 204/286.1 |

OTHER PUBLICATIONS

ASTM D 522–93a, Standard Test Methods for Mandarel Bend Test of Attached Organic Coatings; ASTM: 1993.

* cited by examiner

Primary Examiner—Max Noori
(74) Attorney, Agent, or Firm—Noreen C. Johnson; Christian G. Cabou

(57) ABSTRACT

This invention relates to methods for testing elongation and cracking of coating arrays. The method includes simultaneously applying an elongating force to each of a plurality of coatings, and monitoring the coating integrity including cracks and thickness decrease in each coating. A relative performance characteristic of each coating is then determined based on a correlation between a detected crack and/or thickness decrease in the coating, and the corresponding elongating force.

99 Claims, 5 Drawing Sheets

US 6,460,417 B1

FORMABILITY TESTING OF SMALL-SIZE COATINGS AND MATERIALS

FEDERAL RESEARCH STATEMENT

The U.S. Government may have certain rights in this invention pursuant to NIST contract number 70NANB9H3038.

BACKGROUND OF THE INVENTION

This invention relates to a method for determining mechanical properties of coating arrays. More particularly, the invention allows for the characterization of elongation and cracking of small-size coatings arranged in an array format.

Elongation properties of a coating material are of importance for automotive, telecommunication, and other applications. Conventional methods of elongation measurements involve the use of a large size coating material of about 100 mm in width and 150 mm in length, application of a conical mandrel test apparatus followed by a visual inspection of crack formation and measurement of the distance from the farthest end of the crack to the small end of the mandrel. The disadvantages of this standard method are the need to use a large coating area to obtain measurable parameters, manual measurements, difficulties in evaluation of several coatings simultaneously, and low sensitivity of measurements. A variety of test methods for elongation have been reported. These include the use of a CCD camera to measure the distance between the grid lines and calculate the elongation, automatic tensile test devices, devices to measure elongation due to bending under load, the use of lasers for noncontact elongation measurements and for the enlargement of the measuring range of speckle measuring systems of elongation.

Unfortunately, these techniques do not provide the capabilities for measurements of a large number of small-size coatings. What is needed are devices and methods for determining a variety of mechanical properties of multiple coating arrays. Such applications are of interest in combinatorial development of coating formulations and coatings.

SUMMARY OF THE INVENTION

The present invention solves the above-described problems by providing methods for testing elongation and cracking of coating arrays. In one embodiment, the method comprises simultaneously applying an elongating force to each of a plurality of coatings, and monitoring for a decrease in coating thickness and/or for cracks in each of the coatings. A relative performance characteristic of each coating is then determined based on a correlation between a measured decrease in coating thickness and/or a detected crack and the corresponding force.

In another embodiment, the method comprises depositing a plurality of coatings onto at least one substrate. The coatings are secured in a test arrangement, and a force is applied to each coating in order to bend the coatings. A detection system is then used to visualize cracks in the coatings and/or any decrease in coating thickness.

In still another embodiment of the present invention, the method comprises depositing a plurality of coatings onto at least one substrate, and securing the coatings in a test arrangement. A grid with a suitable scale is then applied onto each coating. A force is applied to each coating in order to bend the coating, and a detection system is used to visualize cracks in each coating and/or a decrease in coating thickness.

Further aspects and advantages of the present invention will be more clearly apparent to those skilled in the art during the course of the following description, references being made to the accompanying drawings which illustrate some preferred forms of the present invention and wherein like characters of reference designate like parts throughout the drawings.

DETAILED DESCRIPTION

Figure 1:
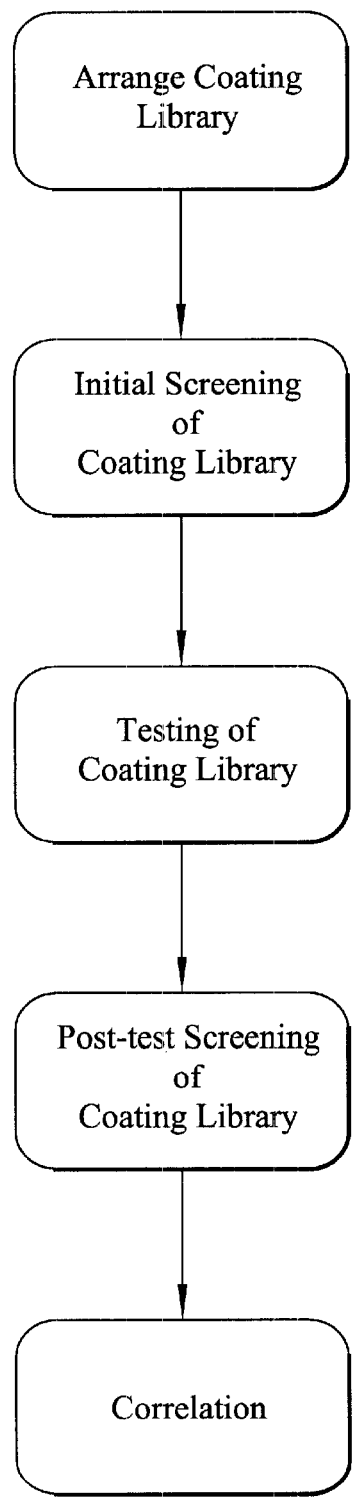
FIG. 1 is a block diagram illustrating the methodology of the present invention.

For the purposes of promoting an understanding of the principles of the invention, reference will now be made to some of the preferred embodiments of the present invention as illustrated in FIGS. 1 through 14. FIG. 1 illustrates the methodology of the present invention. First, a plurality of coatings to be analyzed are arranged in a test arrangement. The plurality of coatings may comprise the same composition or a portion of the coatings may have different compositions. Depending upon the test to be performed, the coatings may be prescreened to determine whether there are any cracks or defects present in the coatings. In addition, a pre-test measurement of coating condition may be taken of each coating during the prescreening process. The coatings are then tested, which includes simultaneously applying an elongating force to each coating. The testing step may be performed under different test conditions wherein factors such as temperature, time, salt spray, electromagnetic radiation including x-rays, ionizing radiation, ultraviolet light, etc., and atmospheric conditions such as moisture content, partial pressure of different gases, and the composition of gas or liquid in contact with the coatings are varied. Post-test screening of each coating is conducted to determine elongation measurements for each coating and to analyze crack formation in the coatings. Finally, the post-test data is compared with the prescreening information to determine the relative performance characteristic of each of the coatings based on a correlation between a detected crack in the coating and the corresponding elongating force. Preferably, the coatings are also screened during the test. In addition, it is desirable that the screening of the coatings be conducted in real-time.

The term "elongation" as used in the present application means elongation in three dimensions caused by bending or forming (e.g. thermoforming or vacuum forming).

Figure 2:
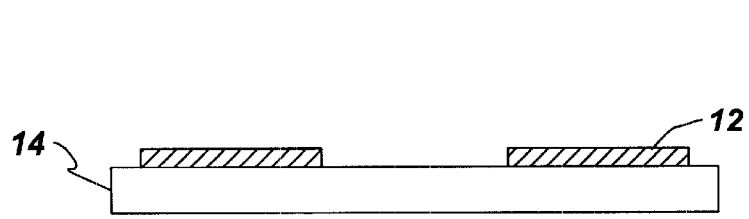
FIGS. 2–6 are side views of an embodiment of the present invention.
Figure 3:
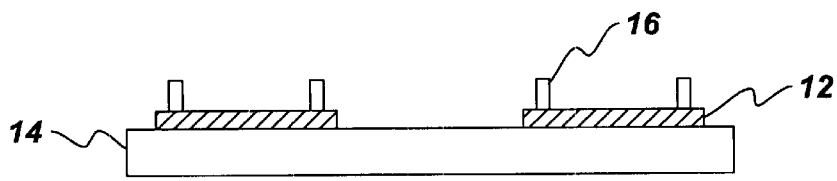

FIGS. 2–6 illustrate one embodiment of the present invention. As shown in FIG. 2, a system 10 for testing coatings comprises a plurality of coatings 12 deposited onto at least one substrate 14. All of the coatings 12 may be applied to one substrate 14, or each coating may be applied to a different substrate. In addition, coatings 12 comprising the same composition may be used to form the plurality of deposited coatings, or coatings having distinct compositions may be used to form the plurality of deposited coatings. Alternatively, coatings 16 comprising a gradient in composition, thickness or other parameter, may be applied to the plurality of substrates 12. If necessary, the coatings 12 are cured after they are deposited onto the substrate 14, using any curing method known in the art.

The coatings 12 are secured onto the substrate 14 in a test arrangement, including but not limited to an array format. If the coatings 12 are arranged in an array format, the number of coatings in the array may range from 2 to 1000. Preferably, the number of coatings in the array ranges from 4 to 500, and more preferably from 9 to 100. The coatings 12 may be secured using any method known to those having skill in the art. Suitable devices for securing the coatings 12 onto the substrate 14 include, but are not limited to clamps 16 and masks. For example, after the coatings 12 are deposited onto the substrate 14, a mask comprising a plurality of openings is applied over the coatings. Each coating 12 is exposed through an opening in the mask.

The substrate 14 may be any shape as long as the substrate comprises a flat surface upon which to deposit the coatings 12. Preferably, the substrate 14 has a substantially flat shape. The substrate 14 is made of a deformable material such that prior to applying a force to the deformable material the material has a first shape, and after a force is applied to the material, the material exhibits and maintains a second shape. Suitable deformable materials include, but are not limited to poly(ethylene)terepthalate, polycarbonate, polyacrylate polyvinylchloride, nylon, poly(butylene terephthalate), polypropylene, polyethylene or blends thereof. Preferably, the substrate 14 comprises polycarbonate.

Any coating 16 known in the art may be utilized in the methods of the present invention. Suitable examples of inorganic coatings include metals, alloys, ceramics, sol-gels, oxides, nitrides, and sulfides. Suitable examples of organic coatings include polymeric, oligomeric and small molecules, where small molecules are individual monomers that react to form a coating. The polymeric coating materials include, but are not limited to, polycarbonates, acrylics, silicones, cellulose esters, polyesters, alkyds, polyurethanes, and vinyl polymers and the like. Preferably, the plurality of organic coating materials include organic polymeric materials, such as "architectural" materials derived from organic materials having protective or decorative functionality, especially including thermoplastic or thermosetting polymers. Preferably, the plurality of inorganic coating materials includes oxides, nitrides and oxinitrides of silicon, aluminum, zinc and boron. Additional examples of suitable coatings include polyvinyl alcohol, ethylene vinyl alcohol copolymers, polyvinyl dichloride, nylon, acrylic, melamine, urethane, polyester, polyether, silicone, cellophane, sol-gel, polyethylene terephthalate (PET), polyvinylchloride (PVC), polychlorotrifluoroethylene (PCTFE), polypropylene, latexes, aminoplast resins, polyurethanes, epoxies, phenolic resins, acrylic resins, polyester resins, alkyd resins, halogenated polymers, cellulose derivative polymers, unsaturated polyester resins, (meth)acrylated oligomers, organic silicon derivative polymers, or combinations thereof. A particular use of this invention is in the evaluation of new types of coatings developed using combinatorial chemistry methods.

The coating 12 may include a single layer or multiple layers. In general, the coating 12 has a lateral measure, i.e. a measure of length across the surface of the substrate 12, much greater than thickness, i.e. a measure of the coating normal to the surface of the substrate. The coating 12 thickness on the substrate 14 is sufficient to allow for bending of the coating without cracking or causing defects in the substrate 14. The coating 12 thickness is typically about 0.0001 micrometer to about 2,000 micrometers. Preferably, the coating thickness is from about 0.001 micrometers to about 1,000 micrometers, and more preferably from about 0.01 micrometer to about 500 micrometers.

The coating 12 may be deposited onto the substrate 14 using a variety of methods including but not limited to the use of a spray nozzle or gun of any type, such as ultrasonic, air, thermal, and airless guns, including those using hydraulic force; microwave or radio frequency ("RF") delivery mechanisms; an ink jet print head; a vapor deposition device, including sputtering, thermal/electron/laser evaporation, chemical vapor deposition (CVD), molecular beam epitaxy, plasma spray, ion beam deposition, spin-casting, dipping, and other methods.

The size of each coating sample 12 on the substrate 14 may range from about 0.001 $cm^2$ to about 100 $cm^2$. Preferably, the size of each coating sample is from about 0.01 $cm^2$ to about 10 $cm^2$, and more preferably from about 0.1 $cm^2$ to about 1.0 $cm^2$.

The coatings 12 are prescreened to determine whether there are any cracks or defects present in the coatings. In addition, a pre-test elongation measurement is taken of each coating 12.

Figure 4:
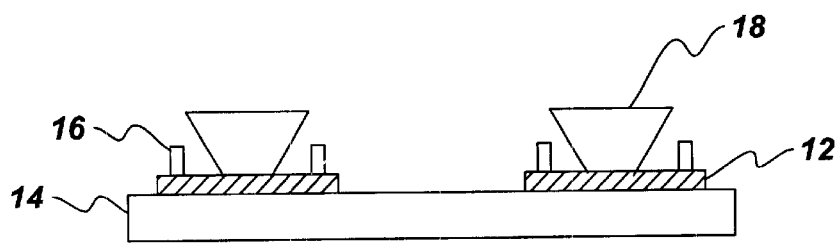
Figure 5:
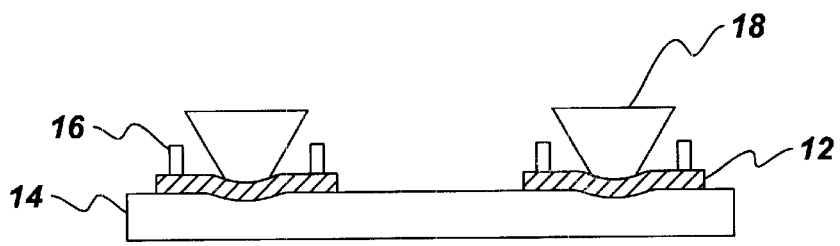
Figure 6:
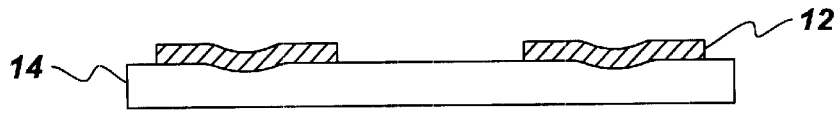
Figure 7:
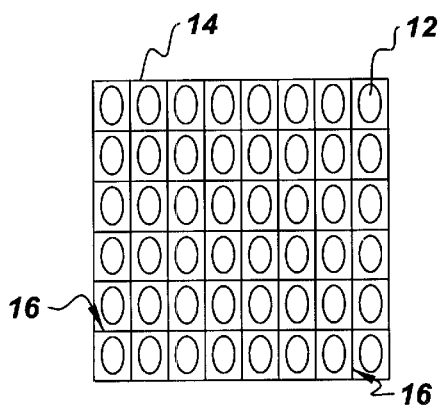
FIGS. 7–9 are top views of an embodiment of the present invention.
Figure 9:
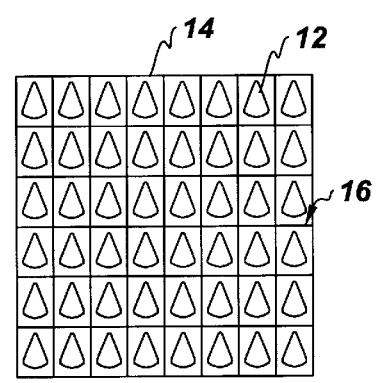
Figure 8:
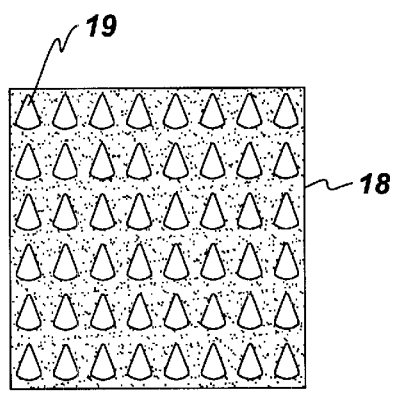

The coatings 12 are secured in such a manner that a force may be applied to each coating in order to bend the coatings. For example, a formability test is performed by simultaneously applying individual test tools 18 to each coating deposit. During the test, the coatings 12 are bent and cracks are formed in those coatings which do not have sufficient elongation. The test tools 18 may be any shape, but are preferably in the shape of a cone, as illustrated in FIGS. 4 and 5. Any combination of test tools 18 may be used with any combination of deposited coatings 12. For example, the same shape test tool 18 may be used to bend each coating 12. Alternatively, different shape test tools 18 may be used to test similar coating 12 deposits. Furthermore, as shown in FIGS. 7–9, the test tool 18 may be a mold comprising a plurality of raised areas 19. The mold is placed on the top and/or bottom of the substrate 14, so that each raised area 19 applies a force to a different coating 12 deposit, thereby bending the coating. The test tools 18, may be used at ambient temperature or may be heated to form a thermoformed library of coatings 12.

The formability test is used to determine the smallest critical radius that can be used with a particular coating 12, and to determine formability measurements of a coating when it is applied onto a hot preform. This test is especially useful in the manufacture of automotive parts, such as formable automotive body parts including but not limited to mirrors, hoods and fenders.

A detection system 20 is used to visualize any cracks formed in the coatings 12 before, during, and after the coatings are bent. If the test tool 18 used to bend the coatings 12 is heated, the coatings may be analyzed while the coatings are heated or after they have cooled. The detection system 20 may produce a single value from each coating 12, or an image of each coating surface may be obtained for manual evaluation or automatic evaluation. A plurality of detection systems 20 may be used to visualize cracks in the coating 12, or a single detection system may be used to screen all of the coatings. The detection system 20 may also be used to prescreen the coatings 12 prior to any testing to determine if the coatings contain any defects or cracks.

Figure 10:
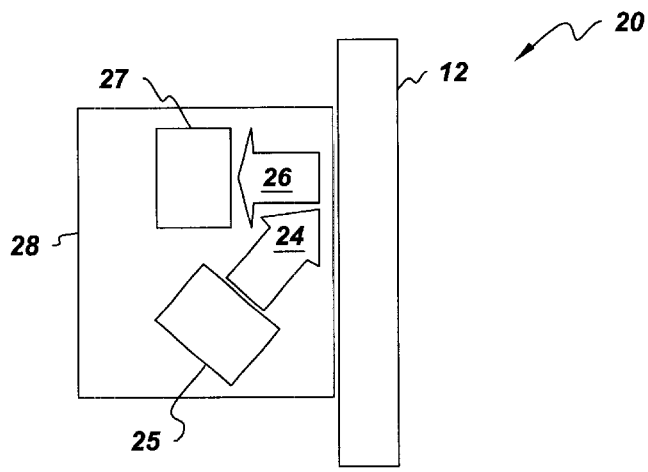
FIG. 10 is an enlarged view of a detection system of the present invention.

Any detection system known in the art may be used in the methods of the present invention. For example, as illustrated in FIG. 10, the detection system 20 may comprise directing excitation light 24 from a light source 25 toward each coating 12. Scattered light 26 or luminescent light 26, such as fluorescent light, from any cracks in the coating 12 is then directed toward a detector 27, which is preferably an imaging detector comprising an optional optical filter. All of the components of the detection system 20 may be housed in a detector housing 28.

Figure 11:
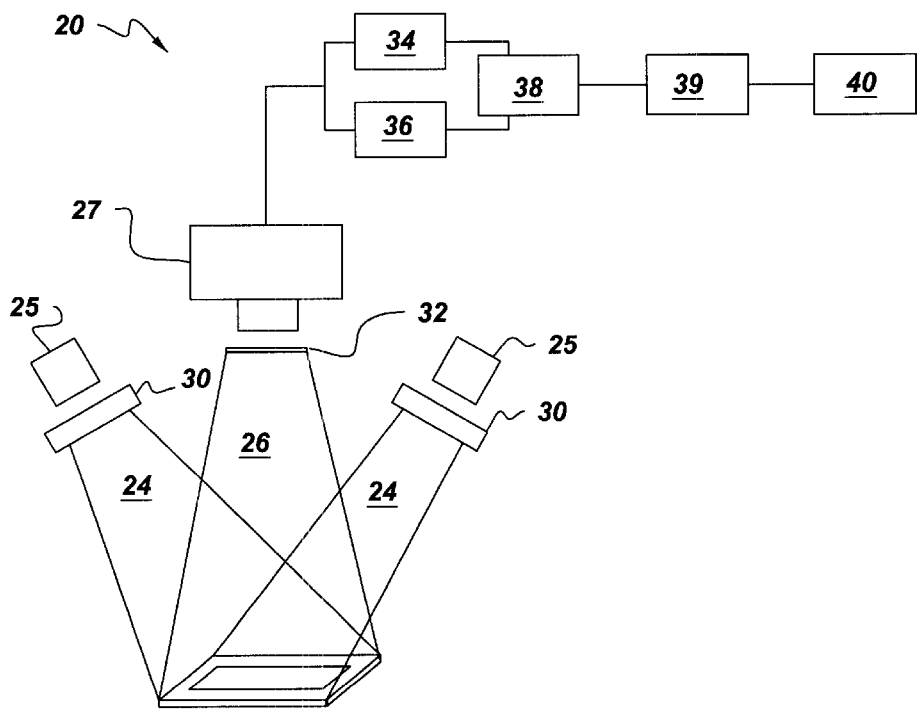
FIG. 11 is a schematic diagram of a detection system of the present invention.

A more detailed illustration of a detection system 20 is shown in FIG. 11. A coating 12 located on a substrate 14 is irradiated with a light source 25 via an excitation wavelength selection element 30. The excitation radiation 24 is selected as desired based on whether scattered light or fluorescent light will be detected from the coating 16. The scattered light 26 or luminescent emission light 26 passes through an emission wavelength selection element 32 and a detector 27, preferably an imaging detector. Pre-test screening data is collected at initial screen 34 and post-test data is collected at intermediate screen 36. Mathematical image processing is performed 38, a structural defects distribution map 39 is obtained, and the coating defects and/or decrease in coating thickness are identified 40.

If luminescent light 26 is to be detected from the coatings 12 as opposed to scattered light 26, the substrate 14 with the deposited coating(s) is dipped in a luminophore solution. When light is directed toward the coatings 12, luminescent light is emitted from any luminophore trapped within the cracks in the coatings. The luminophore solution may be formed from any luminophore which is dissolvable in a suitable solvent. A suitable solvent is one which does not chemically react with the coatings 12 being tested.

Alternatively, a luminophore (fluorescent or phosphorescent dye) or colorimetric dye is embedded into the coating material. Preferably, the incorporated dye does not noticeably change the properties of interest of the coatings and does not noticeably change its optical characteristics upon the change of the environmental conditions (e.g. temperature) during the testing of the coatings. Upon testing of the coating applied onto the substrate, if cracks are formed in the coating due to the elongation of the coating, these changes are visualized using fluorescence, transmitted, and/or reflected light measurements. Also, upon testing of the coating applied onto the substrate, if the coating thickness decreases due to the elongation of the coating, this change is visualized using fluorescence, transmitted, and/or reflected light measurements by relating the amount of collected light and the coating thickness.

The following is a partial list of commercially available, suitable dyes.

5-Amino-9-diethyliminobenzo(a)phenoxazonium Perchlorate; 7-Amino-4-methylcarbostyryl 7-Amino-4-methylcoumarin; 7-Amino- 4-trifluoromethylcoumarin; 3-(2'-Benzimidazolyl)-7-N,N-diethylaminocoumarin; 3-(2'-Benzothiazolyl)-7-diethylaminocoumarin; 2-(4-Biphenylyl)-5-(4-t-butylphenyl)-1,3,4-oxadiazole; 2-(4-Biphenylyl)-5-phenyl-1,3,4-oxadiazole; 2-(4-Biphenyl)-6-phenylbenzoxazole-1,3; 2,5-Bis-(4-biphenylyl)-1,3,4-oxadiazole; 2,5-Bis-(4-biphenylyl)-oxazole; 4,4'-Bis-(2-butyloctyloxy)-p-quaterphenyl; p-Bis(o-methylstyryl)-benzene; 5,9-Diaminobenzo(a) phenoxazonium Perchlorate;4-Dicyanomethylene-2-methyl-6-(p-dimethylaminostyryl)-4H-pyran; 1,1'-Diethyl-2,2'-carbocyanine Iodide; 1,1'-Diethyl-4,4'-carbocyanine Iodide; 3,3'-Diethyl-4,4',5,5'-dibenzothiatricarbocyanine Iodide; 1,1'-Diethyl-4,4'-dicarbocyanine Iodide; 1,1'-Diethyl-2,2'-dicarbocyanine Iodide; 3,3'-Diethyl-9,11-neopentylenethiatricarbocyanine Iodide; 1,3'-Diethyl-4,2'-quinolyloxacarbocyanine Iodide; 1,3'-Diethyl-4,2'-quinolylthiacarbocyanine Iodide; 3-Diethylamino-7-diethyliminophenoxazonium Perchlorate; 7-Diethylamino-4-methylcoumarin; 7-Diethylamino-4-trifluoromethylcoumarin; 7-Diethylaminocoumarin; 3,3'-Diethyloxadicarbocyanine Iodide; 3,3'-Diethylthiacarbocyanine Iodide; 3,3'-Diethylthiadicarbocyanine Iodide; 3,3'-Diethylthiatricarbocyanine Iodide; 4,6-Dimethyl-7-ethylaminocoumarin; 2,2'-Dimethyl-p-quaterphenyl; 2,2-Dimethyl-p-terphenyl; 7-Dimethylamino-1-methyl-4-methoxy-8-azaquinolone-2; 7-Dimethylamino-4-methylquinolone-2; 7-Dimethylamino-4-trifluoromethylcoumarin; 2-(4-(4-Dimethylaminophenyl)-1,3-butadienyl)-3-ethylbenzothiazolium Perchlorate; 2-(6-(p-Dimethylaminophenyl)-2,4-neopentylene-1,3,5-hexatrienyl)-3-methylbenzoPerchlorate; 2-(4-(p-Dimethylaminophenyl)-1,3-butadienyl)-1,3,3-trimethyl-3H indolium Perchlorate; 3,3'-Dimethyloxatricarbocyanine Iodide; 2,5-Diphenylfuran; 2,5-Diphenyloxazole; 4,4'-Diphenylstilbene; 1-Ethyl-4-(4-(p-Dimethylaminophenyl)-1,3-butadienyl)-pyridinium Perchlorate; 1-Ethyl-2-(4-(p-Dimethylaminophenyl)-1,3-butadienyl)-pyridinium Perchlorate; 1-Ethyl-4-(4-(p-Dimethylaminophenyl)-1,3-butadienyl)-quinolium Perchlorate; 3-Ethylamino-7-ethylimino-2,8-dimethylphenoxazin-5-ium Perchlorate; 9-Ethylamino-5-ethylamino-10-methyl-5H-benzo(a) phenoxazonium Perchlorate; 7-Ethylamino-6-methyl-4-trifluoromethylcoumarin; 7-Ethylamino-4-trifluoromethylcoumarin; 1,1',3,3,3',3'-Hexamethyl-4,4',5,5'-dibenzo-2,2'-indotricarboccyanine Iodide; 1,1',3,3,3',3'-Hexamethylindodicarbocyanine Iodide; 1,1',3,3,3',3'-Hexamethylindotricarbocyanine Iodide; 2-Methyl-5-t-butyl-p-quaterphenyl; N-Methyl-4-trifluoromethylpiperidino-<3, 2-g>coumarin; 3-(2'-N-Methylbenzimidazolyl)-7-N,N-diethylaminocoumarin; 2-(1-Naphthyl)-5-phenyloxazole; 2,2'-p-Phenylen-bis (5-phenyloxazole); 3,5,3"",5""-Tetra-t-butyl-p-sexiphenyl; 3,5,3"",5""-Tetra-t-butyl-p-quinquephenyl; 2,3,5,6-1H,4H-Tetrahydro-9-acetylquinolizino-<9,9a, 1-gh>coumarin; 2,3,5,6-1H,4H-Tetrahydro-9-carboethoxyquinolizino-<9,9a,1-gh>coumarin; 2,3,5,6-1H,4H-Tetrahydro-8-methylquinolizino -<9,9a, 1-gh>coumarin; 2,3,5,6-1H,4H-Tetrahydro-9-(3-pyridyl)-quinolizino-<9,9a,1-gh>coumarin; 2,3,5,6-1H,4H-Tetrahydro-8-trifluoromethylquinolizino-<9,9a, 1-gh>coumarin; 2,3,5,6-1H,4H-Tetrahydroquinolizino-<9,9a, 1-gh>coumarin; 3,3', 2",3'"-Tetramethyl-p-quaterphenyl; 2,5,2"",5""-Tetramethyl-p-quinquephenyl; P-terphenyl; P-quaterphenyl; Nile Red; Rhodamine 700; Oxazine 750; Rhodamine 800; IR 125; IR 144; IR 140; IR 132; IR 26; IR 5; Diphenylhexatriene; Diphenylbutadiene; Tetraphenylbutadiene; Naphthalene; Anthracene; 9,10-diphenylanthracene; Pyrene; Chrysene; Rubrene; Coronene; Phenanthrene; Fluorene; Aluminum phthalocyanine;

Alternatively, a chemically sensitive luminophore (fluorescent or phosphorescent dye) or calorimetric dye is embedded into the transparent or opaque substrate material. Upon testing of the coating applied onto the substrate, if cracks are formed in the coating, they make the substrate more accessible to the environment otherwise protected by the coating. The combination of the chemically sensitive dye and environment are selected to flag the formation of cracks with higher contrast compared to the use of non-chemically sensitive reagents. For example, the reagent in the substrate can be sensitive to oxygen partial pressure and the coating deposition can be performed in air. If testing is performed in nitrogen, then the depth-resolved crack formation is monitored in real time by observing the increase in luminescence intensity or luminescence lifetime upon formation of the crack as it reaches the substrate. Alternative reagents may be sensitive to other factors, such as moisture or water vapor.

One class of reagents includes porphyrins. Examples of suitable porphyrins include but are not limited to tetraphenylporphyrin, metal porphyrins, such as platinum (II) octaethylporphyrin (Pt-OEP) and palladium(II) octaethylporphyrin (Pd-OEP), and others as described in P. Hartmann, W. Trettnak, "Effects of polymer matrices on calibration functions of luminescent oxygen sensors based on porphyrin ketone complexes," Anal. Chem. 1996, 68, 2615–2620; A. Mills, A. Lepre, "Controlling the response characteristics of luminescent porphyrin plastic film sensors for oxygen," Anal. Chem. 1997, 69, 4653–4659; Potyrailo, R. A.; Hieftje, G. M., Oxygen detection by fluorescence quenching of tetraphenylporphyrin immobilized in the original cladding of an optical fiber, Anal. Chim. Acta 1998, 370, 1–8.

Another class of reagents includes polycyclic aromatic hydrocarbons. Examples and applications of this class of fluorophores are described by: I. B. Berlman, Handbook of luminescence spectra of aromatic molecules, Academic Press, New York, N.Y., 1971; O. S. Wolfbeis, Fiber Optic Chemical Sensors and Biosensors; O. S. Wolfbeis, Ed.; CRC Press: Boca Raton, Fla., 1991; Vol. 2; pp 19–53; Hobbs, S. E.; Potyrailo, R. A.; Hieftje, G. M., Scintillator light source for chemical sensing in the near-ultraviolet, Anal. Chem. 1997, 69, 3375–3379. Preferred fluorophores of this class include pyrene, pyrenebutyric acid, fluoranthene, decacyclene, diphenylanthracene, and benzo(g,h,l)perylene.

Another class of reagents includes a variety of long-wave absorbing dyes such as perylene dibutyrate, and heterocycles including fluorescent yellow, trypaflavin and other heterocycle compounds as described by: O. S. Wolfbeis, Fiber Optic Chemical Sensors and Biosensors; O. S. Wolfbeis, Ed.; CRC Press: Boca Raton, Fla., 1991; Vol. 2; pp 19–53.

Yet another group of reagents includes metal-organic complexes of ruthenium, osmium, iridium, gold and platinum as described by: O. S. Wolfbeis, Fiber Optic Chemical Sensors and Biosensors; O. S. Wolfbeis, Ed.; CRC Press: Boca Raton, Fla., 1991; Vol. 2; pp 19–53, J. N. Demas, B. A. Degraff, P. B. Coleman, "Oxygen sensors based on luminescence quenching," Anal. Chem. 1999, 71, 793A–800A; J. N. Demas, B. A. DeGraff, "Design and applications of highly luminescent transition metal complexes," Anal. Chem. 1991, 63, 829A–837A; A. Mills, A. Lepre, B. R. Theobald, E. Slade, B. A. Murrer, "Use of luminescent gold compounds in the design of thin-film oxygen sensors," Anal. Chem. 1997, 69, 2842–2847; Potyrailo, R. A.; Hieftje, G. M., Use of the original silicone cladding of an optical fiber as a reagent-immobilization medium for intrinsic chemical sensors, Fresenius' J. Anal. Chem. 1999, 364, 32–40.

Yet another group of reagents includes solvatochromic dyes as extensively reviewed in, for example, C. Reichardt, Chemical Reviews, volume 94, pages 2319–2358 (1994); C. Reichardt, S. Asharin-Fard, A. Blum, M. Eschner, A. M. Mehranpour, P. Milart, T. Nein, G. Schaefer, and M. Wilk, Pure and Applied Chemistry, volume 65, no.12, pages 2593–601 (1993); E. Buncel and S. Rajagopal, Accounts of Chemical Research, volume 23, no. 7, pages 226–31 (1990); and C. Reichardt, "Solvents and Solvent Effects in Organic Chemistry, 2nd Ed.", VCH Publishers: Weinheim, 1988. Preferred fluorescent solvatochromic dyes have a luminescence quantum yield of greater than about 0.01. Other characteristics of the dyes include positive and negative solvatochromism which corresponds to the bathochromic and hypsochromic shifts, respectively of the emission band with increasing solvent polarity. In addition to the solvent-induced spectral shifts of the emission spectra, some dyes exhibit the solvent-dependent ratio of emission intensities of two luminescence bands. One such solvatochromic dye is pyrene. Some examples of preferred solvatochromic dyes include 4-dicyanmethylene-2-methyl-6-(p-dimethylaminostyryl)-4H-pyran (DCM; CAS Registry No. 51325-91-8); 6-propionyl-2-(dimethylamino)naphthalene (PRODAN; CAS Registry No. 70504-01-7); 9-(diethylamino)-5H-benzo[a]phenoxazin-5-one (Nile Red; CAS Registry No. 7385-67-3); phenol blue; stilbazolium dyes; coumarin dyes; ketocyanine dyes, including CAS Registry No. 63285-01-8; Reichardt's dyes including Reichardt's Betaine dye (2,6-diphenyl-4-(2,4,6-triphenylpyridinio)phenolate; CAS Registry No. 10081-39-7); merocyanine dyes, including merocyanine 540 (CAS Registry No. 62796-23-0); so-called $\pi^*$ dyes, including N,N-dimethyl-4-nitroaniline (NDMNA; CAS Registry No.100-23-2) and N-methyl-2-nitroaniline (NM2NA; CAS Registry No. 612-28-2); and the like. Applications of solvatochromic dyes for monitoring of moisture are described for example in Sadaoka, Y.; Matsuguchi, M.; Sakai, Y.; Murata, Y.-U., Optical humidity sensor using Reichardt's betain dye-polymer composites, Chem. Lett. 1992, 53–56; Sadaoka, Y.; Sakai, Y.; Murata, Y., Optical humidity and ammonia gas sensors using Reichardt's dye-polymer composites, Talanta 1992, 39, 1675–1679; Potyrailo, R. A.; Hieftje, G. M., Use of the original silicone cladding of an optical fiber as a reagent-immobilization medium for intrinsic chemical sensors, Fresenius' J. Anal. Chem. 1999, 364, 32–40.

Yet another group of reagents includes colorimetric and luminescent acid-base and cationic reagents as extensively reviewed in, for example, Kolthoff, 1. M. Acid-Base Indicators; The MacMillan Company: New York, 1937; Bacci, M.; Baldini, F.; Bracci, S., Spectroscopic behavior of acid-base indicators after immobilization on glass supports, Appl. Spectrosc. 1991, 45, 1508–1515; Sadaoka, Y.; Matsuguchi, M.; Sakai, Y.; Murata, Y.-U., Optical humidity sensing characteristics of Nafion-dyes composite thin films, Sens. Actuators B 1992, 7, 443–446; Sadaoka, Y.; Sakai, Y.; Murata, Y., Optical properties of cresyl violet-polymer composites for quantification of humidity and ammonia gas in ambient air, J. Mater. Chem. 1993, 3, 247–251; Zinger, B.; Shier, P., Spectroscopic studies of cationic dyes in Nafion, Preliminary investigation of a new sensor for hydrophilic contamination in organic solvents, Sens. Actuators B 1999, 56, 206–214; Haugland, R. P. Handbook of Fluorescent Probes and Research Chemicals; Molecular Probes: Eugene, Oreg, 1996. Some of these dyes are thymol blue, congo red, methyl orange, bromocresol green, methyl red, bromocresol purple, bromothymol blue, cresol red, phenolphthalein, SNAFL indicators, SNARF indicators, 8-hydroxypyrene-1, 3,6-trisulfonic acid, fluoresce in and its derivatives, oregon green, and a variety of dyes mostly used as laser dyes including rhodamine dyes, styryl dyes, cyanine dyes, and a large variety of other dyes. These reagents may also be referred to as pH reagents.

Yet another group of reagents includes oxygen-sensitive calorimetric reagents. Some reagents useful for colorimetric determinations of molecular oxygen are reviewed in Chemical Detection of Gaseous Pollutants; Ruch, W. E., Ed.; Ann Arbor Science Publishers: Ann Arbor, Ml, 1968. These include, among others, 2,4-diaminophenol dihydrochloride, manganous oxide, combination of manganous hydroxide and potassium iodide containing starch, ferrous salt in combination with methylene blue, reduced form of sodium anthraquinone-B-sulfonate, reduced form of ammonium anthraquinone-2-sulfonate, carbohydrate of Tschitschibabin, alkaline pyrogallol, and ammoniacal cuprous chloride.

Yet another group of reagents includes oxygen-sensitive chemoluminescent reagents. Some reagents useful for chemoluminescent determinations of molecular oxygen are reviewed in: O. S. Wolfbeis, Fiber Optic Chemical Sensors and Biosensors; O. S. Wolfbeis, Ed.; CRC Press: Boca Raton, Fla., 1991; Vol. 2; pp 19–53. Among others, useful chemoluminescent compounds for oxygen determinations are poly(ethylene-2,6-naphthalene-dicarboxylate), tetraamino-ethylenes without aromatic functions, and many others.

Additional fluorophores which are suitable for use in the methods of the present invention include Lumogen F (available from BASF, Inc.), Yellow dye 083, Red dye 300, Orange dye 240 and Violet dye 570.

An initial elongation measurement may be taken of each coating 12 during the prescreening process before the coating is tested. The elongation of each coating 12 is measured after the coating is tested relative to the initial coating condition.

As explained above, if the test tools 18 used to bend the coatings 12 are heated, the elongation measurement may be taken while the coatings are heated or after they have cooled. The elongation may be calculated in units of extensibility or in percent elongation. For example, a prescreen coating measurement of 5 mm and a post-test coating measurement of 10 mm demonstrates 100% elongation.

Figure 12:
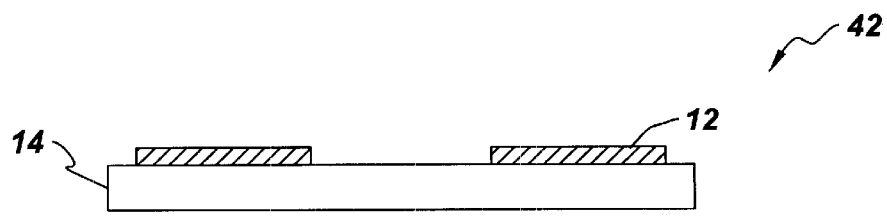
FIGS. 12–14 are side views of an alternative embodiment of the present invention.
Figure 13:
Figure 14:
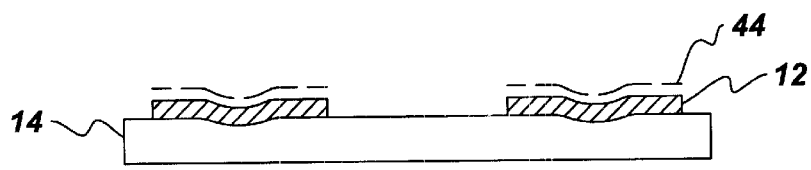

In one embodiment of the present invention, a grid 44 is applied onto each coating 12. This system 44 for testing coatings is illustrated in FIGS. 12–14. The grid 44 may be applied by any method known in the art including, but not limited to printing, spraying through a mask and screen printing, such as silk screen printing. The grid 44 may be applied directly to the substrate 14 prior to or after depositing the coating 12, if the substrate 14 is thin enough so that elongation of the coating and substrate are equal when a force is applied to the coating. The number of lines in each grid 44 will vary depending on the shape of the test tool 18 being used and the detection capabilities of the detection system 20. The grid 44 typically comprises from about 1 to about 1000 grid lines. Preferably, the grid comprises from about 2 to about 100 grid lines. More preferably, the grid comprises from about 3 to about 50 grid lines.

After the coatings 12 are bent with a test tool 18, the grid 44 is used to measure the elongation of the coatings. The elongation results are determined based on the difference in position of the grid 44 before and after the test is performed. A detection system 20 as previously described is used to image the coatings library and analyze the image before and after the test to determine the elongation measurements and to visualize any cracks formed in the coatings and/or decrease in coating thickness.

It should be understood that the following items may remain constant or be varied in any test performed using the methods of the present invention: composition of coatings; thickness of coatings; number of coating deposits on a substrate; testing tool shape; testing tool temperature; number of substrates used; and composition of substrate.

It is apparent that there have been provided in accordance with this invention, methods of elongation and cracking testing for coatings. While the invention has been particularly shown and described in conjunction with preferred embodiments thereof, it will be appreciated that variations and modifications can be effected by a person of ordinary skill in the art without departing from the scope of the invention.

What is claimed is:

1. A method for testing coatings comprising:
depositing a plurality of coatings onto at least one substrate;
securing the coatings in a test arrangement;
applying a force to each coating in order to bend the coating; and
using a detection system to determine a performance characteristic of each coating comprising immersing the substrate in a luminophore solution, directing light toward each coating and detecting luminescent light from the luminophore located in any cracks in each coating.

2. The method of claim 1, wherein the force is an elongating force.

3. The method of claim 2, further comprising determining a relative performance characteristic of each of the plurality of coatings based on a correlation between a detected crack in the coating or a decrease in thickness of the coating, and the corresponding elongating force.

4. The method of claim 1, wherein portions of the plurality of coatings have different compositions.

5. The method of claim 1, wherein the test arrangement is an array format.

6. The method of claim 1, wherein each coating is deposited onto a single substrate.

7. The method of claim 1, further comprising applying a grid to the substrate.

8. The method of claim 1, wherein the coatings comprise oxides, nitrides and oxinitrides of silicon, aluminum, zinc and boron, polyvinyl alcohol, ethylene vinyl alcohol copolymers, polyvinyl dichloride, nylon, acrylic, melamine, urethane, polyester, polyether, silicone, cellophane, sol-gel, polyethylene terepthalate, polyvinylchloride, polychlorotrifluoroethylene (PCTFE), polypropylene, latexes, aminoplast resins, polyurethanes, epoxies, phenolic resins, acrylic resins, polyester resins, alkyd resins, halogenated polymers, cellulose derivative polymers, unsaturated polyester resins, (meth)acrylated oligomers, organic silicon derivative polymers or combinations thereof.

9. The method of claim 1, further comprising exposing the coatings to test conditions such as temperature, time, electromagnetic radiation, ionizing radiation, ultraviolet light, moisture, salt spray, partial pressure of different gases, or varying compositions of gas or liquid in contact with the coatings.

10. The method of claim 1, wherein the size of each coating is from about 0.001 $cm^2$ to about 100 $cm^2$.

11. The method of claim 1, wherein the coatings are secured with a clamp or a mask.

12. The method of claim 1, wherein a force is applied to the coatings by applying a test tool to each coating.

13. The method of claim 12, wherein the test tool is in the shape of a cone.

14. The method of claim 12, wherein the test tool is a mold comprising a plurality of raised areas and each raised area applies a force to a different coating on the substrate.

15. The method of claim 14, wherein the mold is heated.

16. The method of claim 1, further comprising prescreening each coating prior to applying a force to the coatings.

17. The method of claim 1, wherein the detection system comprises:
directing light toward each coating; and
detecting scattered light from any cracks in each coating.

18. The method of claim 1, wherein the detection system comprises:
immersing the substrate in a luminophore solution;
directing light toward each coating; and
detecting luminescent light from the luminophore located in any cracks in each coating.

19. The method of claim 1, wherein each coating comprises a luminescent or calorimetric reagent.

20. The method of claim 19, wherein the detection system comprises:
directing light toward each coating; and
detecting luminescent or colored light from the reagent in the coating.

21. The method of claim 1, wherein the substrate comprises a luminescent or colorimetric reagent.

22. The method of claim 21, wherein the detection system comprises:
directing light toward each coating; and
detecting luminescent or colored light from the reagent in the substrate.

23. The method of claim 1, further comprising measuring an elongation of each coating after the force is applied to the coatings.

24. The method of claim 1, wherein the substrate comprises deformable material.

25. The method of claim 24, wherein the substrate comprises poly(ethylene) terepthalate, polycarbonate, polyacrylate, polyvinyl chloride, nylon, poly (butylene terephthalate), polypropylene, polyethylene, or blends thereof.

26. The method of claim 25, wherein the substrate comprises polycarbonate.

27. The method of claim 1, further comprising prescreening each coating.

28. The method of claim 27, wherein the force is an elongating force.

29. The method of claim 27, wherein each coating is deposited onto a single substrate.

30. The method of claim 27, wherein the test arrangement is an array format.

31. The method of claim 30, wherein the substrate comprises deformable material.

32. The method of claim 31, wherein the substrate comprises poly(ethylene) terepthalate, polycarbonate, polyacrylate, polyvinyl chloride, nylon, poly (butylene terephthalate), polypropylene, polyethylene, or blends thereof.

33. The method of claim 27, wherein the coatings comprise oxides, nitrides and oxinitrides of silicon, aluminum, zinc and boron, polyvinyl alcohol, ethylene vinyl alcohol copolymers, polyvinyl dichloride, nylon, acrylic, melamine, urethane, polyester, polyether, silicone, cellophane, sol-gel, polyethylene terepthalate, polyvi nylchloride, polych lorotrifl uoroethylene (PCTFE), polypropylene, latexes, aminoplast resins, polyurethanes, epoxies, phenolic resins, acrylic resins, polyester resins, alkyd resins, halogenated polymers, cellulose derivative polymers, unsaturated polyester resins, (meth) acrylated oligomers, organic silicon derivative polymers or combinations thereof.

34. The method of claim 33, wherein the size of each coating is from about 0.001 cm$^2$ to about 100 cm$^2$.

35. The method of claim 33, wherein the coatings are secured with a clamp or a mask.

36. The method of claim 33, wherein a force is applied to the coatings by applying a test tool to each coating.

37. The method of claim 36, wherein the test tool is in the shape of a cone.

38. The method of claim 36, wherein the test tool is a mold comprising a plurality of raised areas and each raised area applies a force to a different coating.

39. The method of claim 38, wherein the mold is heated.

40. The method of claim 33, wherein the detection system comprises:
directing light toward each coating; and
detecting scattered light from any cracks in each coating.

41. The method of claim 33, wherein each coating comprises a luminescent or colorimetric reagent.

42. The method of claim 41, wherein the detection system comprises:
directing light toward each coating; and
detecting luminescent or colored light from the reagent in the coating.

43. The method of claim 33, wherein the substrate comprises a luminescent or calorimetric reagent.

44. The method of claim 43, wherein the detection system comprises:
directing light toward each coating; and
detecting luminescent or colored light from the reagent in the substrate.

45. The method of claim 33, further comprising measuring an elongation of each coating after the force is applied to the coatings.

46. The method of claim 1 comprising applying a grid onto each coating prior to applying the force.

47. The method of claim 46, wherein the force is an elongating force.

48. The method of claim 47, further comp rising determining a relative performance characteristic of each of the plurality of coatings based on a correlation between a detected crack in the coating or decrease in coating thickness, and the corresponding elongating force.

49. The method of claim 46, wherein a portion of the plurality of coatings have different compositions.

50. The method of claim 46, wherein the test arrangement is an array format.

51. The method of claim 46, wherein each coating is deposited onto a single substrate.

52. The method of claim 46, wherein the grid is applied by spraying through a mask or screen printing.

53. The method of claim 46, wherein the coatings comprise oxides, nitrides and oxinitrides of silicon, aluminum, zinc and boron, polyvinyl alcohol, ethylene vinyl alcohol copolymers, polyvinyl dichloride, nylon, acrylic, melamine, urethane, polyester, polyether, silicone, cellophane, sol-gel, polyethylene tereptphalate, polyvinylch loride, polych lorotrifluoroethylene (PCTFE), polypropylene, latexes, aminoplast resins, polyurethanes, epoxies, phenolic resins, acrylic resins, polyester resins, alkyd resins, halogenated polymers, cellulose derivative polymers, unsaturated polyester resins, (meth) acrylated oligomers, organic silicon derivative polymers or combinations thereof.

54. The method of claim 46, wherein the size of each coating is from about 0.001 cm$^2$ to about 100 cm$^2$.

55. The method of claim 46, wherein the coatings are secured with a clamp or a mask.

56. The method of claim 46, wherein a force is applied to the coatings by applying a test tool to each coating.

57. The method of claim 46, wherein the test tool is in the shape of a cone.

58. The method of claim 56, wherein the test tool is a mold comprising a plurality of raised areas and each raised area applies a force to a different coating.

59. The method of claim 58, wherein the mold is heated.

60. The method of claim 46, further comprising pre-screening each coating prior to applying a force to the coatings.

61. The method of claim 46, wherein the detection system comprises:
directing light toward each coating; and
detecting scattered light from any cracks in each coating.

62. The method of claim 46, wherein each coating comprises a luminescent or colorimetric reagent.

63. The method of claim 62, wherein the detection system comprises:
directing light toward each coating; and
detecting luminescent or colored light from the reagent in the coating.

64. The method of claim 46, wherein the substrate comprises a luminescent or colorimetric reagent.

65. The method of claim 64, wherein the detection system comprises:
directing light toward each coating; and
detecting luminescent or colored light from the reagent in the substrate.

66. The method of claim 46, further comprising measuring an elongation of each coating after the force is applied to the coatings.

67. The method of claim 46, wherein the substrate comprises a deformable material.

68. The method of claim 67, wherein the substrate comprises, poly(ethylene) terepthalate, polycarbonate, polyacrylate, polyvinyl chloride, nylon, poly (butylene terephthalate), polypropylene, polyethylene, or blends thereof.

69. The method of claim 68, wherein the substrate comprises polycarbonate.

70. A method for testing coatings comprising:
forming a coated substrate by depositing a coating onto the substrate;
deforming the coating at a coated substrate location;
determining a performance characteristic by detecting the coating at the deformed location; and
determining a performance characteristic of the coating by immersing the substrate in a solution; directing light toward the coating and detecting light from the solution located in any crack in the coating.

71. The method of claim 70, comprising forming the coated substrate by depositing a plurality of coatings onto the substrate and securing the coatings in a test arrangement.

72. The method of claim 71, further comprising determining a relative performance characteristic of each of the plurality of coatings based on a correlation between a detected crack in the coating or a decrease in thickness of the coating, and the corresponding elongating force.

73. The method of claim 71, wherein portions of the plurality of coatings have different compositions.

74. The method of claim 71, wherein the test arrangement is an array format.

75. The method of claim 71, wherein each coating is deposited onto a single substrate.

76. The method of claim 71, further comprising applying a grid to the substrate.

77. The method of claim 70, wherein the coating is an inorganic coating comprising a metal, an alloy, ceramic, sol-gel, oxide, nitride or sulfide.

78. The method of claim 70, wherein the coating is a polymer, oligomer or a monomer that reacts to form a coating.

79. The method of claim 70, wherein the coating is a polycarbonate, polyacrylate, polysilicone, cellulose ester, polyester, polyalkyd, polyurethane or vinyl polymer.

80. The method of claim 70, wherein the coating is a thermoplastic polymer or a thermosetting polymer.

81. The method of claim 70, wherein the coating is a polyvinyl alcohol, ethylene vinyl alcohol copolymer, polyvinyl dichloride, nylon, acrylic polymer, melamine polymer, polyester, polyether, silicone polymer, cellophane, a sol-gel, polyethylene terephtalate (PET), polyvinylchloride (PVC), polychlorotrifluoroethylene (PCTFE), polypropylene, a latex, an aminoplast resin, a polyurethane, polyepoxide, phenolic resin, acrylic resin, polyester resin, alkyd resin, halogenated polymer, cellulose derivative polymer, unsaturated polyester resin, (meth)acrylated oligomer, organic silicon derivative polymer or combinations thereof.

82. The method of claim 70, wherein the size of the coating is from about 0.001 $cm^2$ to about 100 $cm^2$.

83. The method of claim 70, comprising applying a mask with a plurality of openings over the coating.

84. The method of claim 70, comprising deforming the coating at a coated substrate location by applying a force with a test tool.

85. The method of claim 70, comprising deforming the coating at a coated substrate location by applying a force with a test tool in the shape of a cone.

86. The method of claim 70, comprising deforming the coating at a coated substrate location by applying a force with a mold comprising a plurality of raised areas.

87. The method of claim 70, comprising forming the coated substrate by depositing a plurality of coatings onto the substrate and deforming the coatings by applying a force with a mold comprising a plurality of raised areas wherein each raised area the plurality applies a force to a different coating on the substrate.

88. The method of claim 70, comprising forming the coated substrate by depositing a plurality of coatings onto the substrate and deforming the coatings by applying a force with a heated mold comprising a plurality of raised areas wherein each raised area the plurality applies a force to a different coating on the substrate.

89. The method of claim 70, further comprising pre-screening the coating prior to deforming the coating.

90. The method of claim 70, comprising determining a performance characteristic of the coating by directing light toward the coating and detecting scattered light from any crack in the coating.

91. The method of claim 70, wherein the coating comprises a luminescent or calorimetric reagent.

92. The method of claim 70, wherein the coating comprises a luminescent or colormetric reagent and determining a performance characteristic comprises directing light toward each coating and detecting luminescent or colored light from the reagent in the coating.

93. The method of claim 70, wherein the substrate comprises a luminescent or colorimetric reagent.

94. The method of claim 70, wherein the substrate comprises a luminescent or colorimetric reagent determining a performance characteristic comprises directing light toward each coating and detecting luminescent or colored light from the reagent in the substrate.

95. The method of claim 70, comprising measuring a deformation of the coating.

96. The method of claim 70, wherein the substrate comprises a polycarbonate.

97. The method of claim 70, comprising forming the coated substrate and subjecting the coated substrate to parallel reaction in a combinatorial procedure prior to deforming n g the coating.

98. The method of claim 70, further comprising pre-screening the coating.

99. The method of claim 70, further comprising applying a grid onto the coating prior to deforming.

* * * * *